April 24, 1928.      E. W. SMITH      1,667,444
DIMENSION GUIDE DEVICE
Filed Jan. 13, 1927
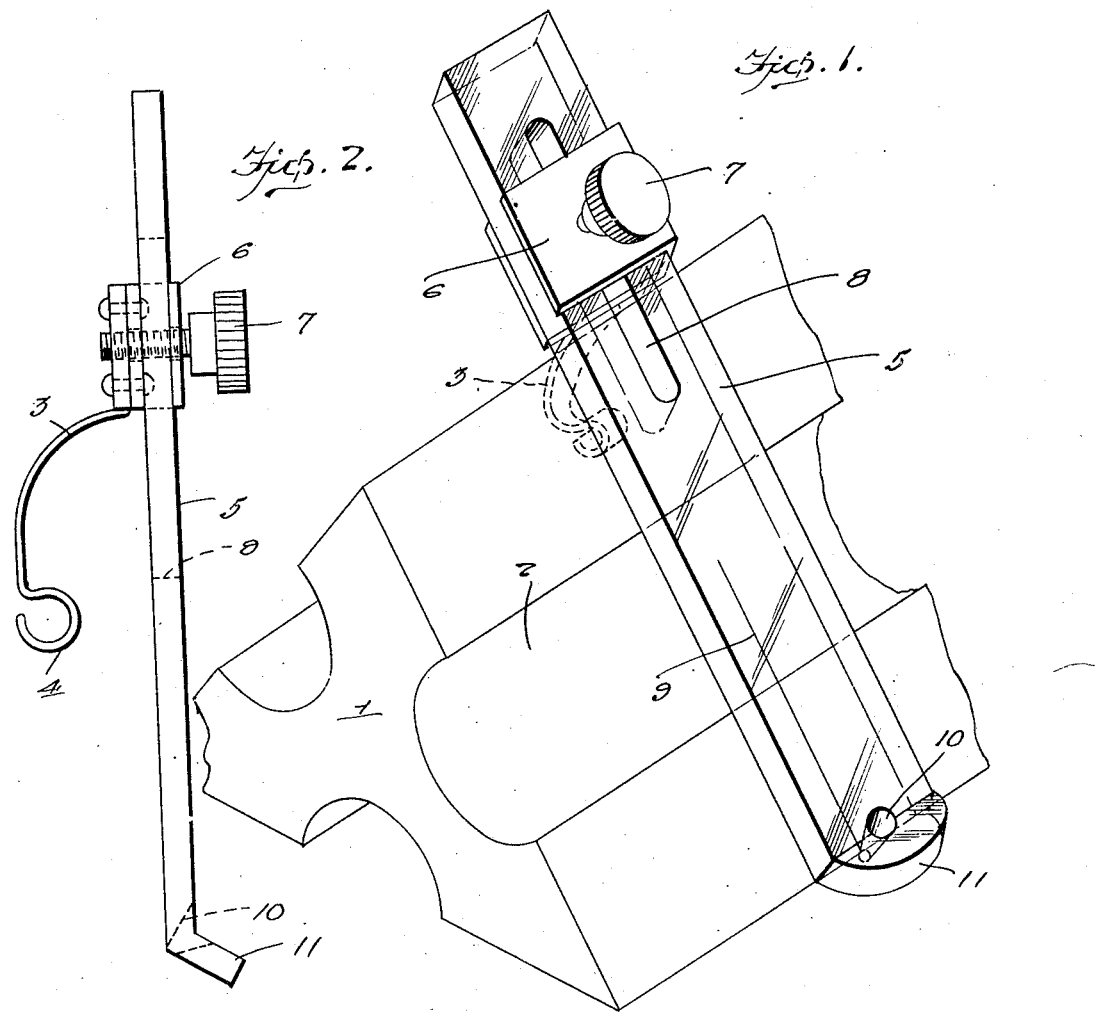
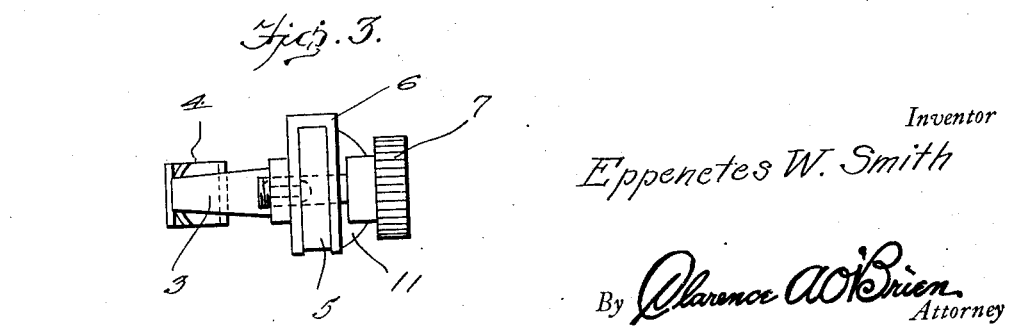
Inventor
*Eppenetes W. Smith*
By *Clarence A. O'Brien*, Attorney

Patented Apr. 24, 1928.

1,667,444

UNITED STATES PATENT OFFICE.

EPPENETES W. SMITH, OF BROOKLYN, NEW YORK.

DIMENSION GUIDE DEVICE.

Application filed January 13, 1927. Serial No. 160,923.

The object of my present invention is the provision of a dimension guide device, designed and adapted to fit on an ordinary triangular scale, and adjustable on the scale in the direction of the length thereof, and calculated to be used to advantage in the process of transferring scale dimensions; the device including a transparent main leg with indicating means thereon and a recess therein in alignment with the indicating means through which recess a clear and accurate marking may be effected equal to the desired dimension or scale reading.

To the attainment of the foregoing the invention consists in the improvement as hereinafter described and definitely claimed.

In the accompanying drawing forming part of this specification:

Figure 1 is a perspective showing the dimension guide device constituting the preferred embodiment of my invention as properly applied to an ordinary triangular scale.

Figure 2 is an edge elevation of the dimension guide device per se.

Figure 3 is a plan view of the dimension guide device.

Similar numerals of reference designate corresponding parts in all the views of the drawing.

The triangular scale 1 shown in Figure 1 is of the ordinary construction characterized by longitudinal grooves 2.

My novel dimension guide device comprises among other elements, a spring arm 3, the extremity 4 of which is preferably shaped as shown so as to readily slide in one of the grooves 2 of the scale 1. The dimension guide device also comprises a transparent member 5, of glass, or other material compatible with its purpose, a slide 6 on said member 5 and to which the spring arm 3 is connected, and a set screw 7 for adjustably fixing the slide 6 with respect to the transparent member 5. The transparent member 5 is provided at 8 with a slot for the reception of the set screw 7, the said set screw 7 bearing in the slide 6 which straddles the transparent member 5 after the manner clearly shown in Figures 1 and 3. It will also be understood from Figures 1 and 2 that the transparent member 5 is provided with a vertical indicator 9 which is in alignment with a recess or aperture 10 in the member 5; also, that the member 5 is provided at its lower end with a foot 11 disposed at an angle of about one hundred and twenty degrees to the major portion of the member 5 and adapted to rest upon a drawing board or table.

Manifestly the spring arm 3 is designed to be adjusted on the member 5 in the direction of the length of the latter, and may be readily secured after adjustment by manipulation of the set screw 7.

It will be apparent from the foregoing that in the practical use of my improvement a clear and accurate marking may be quickly and precisely effected without difficulty or undue eye strain; also, that in the process of transferring scale dimensions, the citing, guiding and locating of the same by means of the adjustable device which holds by virtue of tension over the apex of the triangular scale and which is movable along the scale and which may be readily removed and as easily reapplied, may be readily attained. In this connection it will also be understood that through the aperture 10 a clear and accurate marking may be made equal to the desired dimension or scale reading.

Notwithstanding the practical advantage of my novel device as pointed out in the foregoing, it will be appreciated that the device is simple and inexpensive in construction and is free of delicate parts such as are likely to get out of order after a short period of use.

I have specifically described the preferred embodiment of my invention in order to impart a full, clear and exact understanding of the said embodiment. I do not desire, however, to be understood as confining myself to the precise construction disclosed, my invention being defined by my appended claims within the scope of which modifications may be made without departure from my invention.

Having thus described the invention, what I claim is:—

1. A dimension guide device comprising a transparent member adapted to be arranged at one side of a triangular scale, and having a vertical indicator, and also having at its lower end an angularly disposed foot and in its lower portion an aperture in alignment with said indicator, a spring arm adapted to exert tension against another side of the triangular scale, and means adjustable on the transparent member in the direction of the length thereof for adjustably connecting the spring arm to the transparent member.

2. In a dimension guide device, a transparent member adapted to be arranged at the side of a scale and having a vertical indicator and also having an aperture through the transparent member for marking purposes at the lower end of and in alignment with said indicator; the said member also having at its lower end an angularly disposed foot.

3. A dimension guide device comprising a transparent member having a longitudinal slot and an indicator disposed vertically and also having an aperture for marking purposes in alignment with said indicator and further having at its lower end an angularly disposed foot, a slide on said member, a spring arm carried by said slide, and a set screw bearing in the slide and extending through the slot of the transparent member and adapted to clamp the slide against the transparent member for the adjustable fixing of the spring arm relative to the transparent member.

In testimony whereof I affix my signature.

EPPENETES W. SMITH.